(12) United States Patent
Yang

(10) Patent No.: US 12,484,110 B2
(45) Date of Patent: Nov. 25, 2025

(54) DATA TRANSMISSION METHOD AND APPARATUS, AND COMMUNICATION DEVICE AND STORAGE MEDIUM

(71) Applicant: BEIJING XIAOMI MOBILE SOFTWARE CO., LTD., Beijing (CN)

(72) Inventor: Xing Yang, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 404 days.

(21) Appl. No.: 18/010,433

(22) PCT Filed: Jun. 15, 2020

(86) PCT No.: PCT/CN2020/096186
§ 371 (c)(1),
(2) Date: Dec. 14, 2022

(87) PCT Pub. No.: WO2021/253183
PCT Pub. Date: Dec. 23, 2021

(65) Prior Publication Data
US 2024/0292485 A1    Aug. 29, 2024

(51) Int. Cl.
*H04W 76/28* (2018.01)
*H04L 1/1867* (2023.01)
*H04W 68/02* (2009.01)
*H04W 72/25* (2023.01)

(52) U.S. Cl.
CPC ........... *H04W 76/28* (2018.02); *H04L 1/1896* (2013.01); *H04W 68/025* (2013.01); *H04W 72/25* (2023.01)

(58) Field of Classification Search
CPC .. H04L 1/1896; H04W 68/025; H04W 72/25; H04W 76/28
See application file for complete search history.

(56) References Cited

U.S. PATENT DOCUMENTS

2017/0289940 A1    10/2017  Yang et al.
2019/0116626 A1*   4/2019   Zhao .................... H04W 76/14
2023/0064488 A1*   3/2023   Han ..................... H04W 76/28

FOREIGN PATENT DOCUMENTS

| CN | 108207017 A | 6/2018 |
| CN | 108307486 A | 7/2018 |
| CN | 109246744 A | 1/2019 |
| CN | 109479189 A | 3/2019 |

(Continued)

OTHER PUBLICATIONS

Sequans Communications, "Discussion on paging relay and sidelink maintenance," 3GPP TSG-RAN WG2 Meeting #97bis, R2- 1703593, Spokane, USA, Apr. 3-7, 2017 (Year: 2017).*

(Continued)

*Primary Examiner* — Brian P Cox
(74) *Attorney, Agent, or Firm* — Arch & Lake LLP

(57) ABSTRACT

The present disclosure relates to a data transmission method and apparatus and a communication device. The data transmission method comprises: according to a discontinuous reception (DRX) parameter of a sidelink, which parameter is determined by means of a Uu port DRX parameter of a first user equipment (UE), performing data transmission between the first UE and second UE by means of the sidelink during a wake-up period of the first UE.

18 Claims, 5 Drawing Sheets

(56) References Cited

FOREIGN PATENT DOCUMENTS

CN 110945962 A 3/2020

OTHER PUBLICATIONS

International Search Report issued in Application No. PCT/CN2020/096186 dated Mar. 4, 2021, with English translation,(5p).
NTT Docomo Inc, et al., Clarification on DRX Handling of emTC and Nb-Iot, 3GPP TSG-RAN WG2 Meeting 97 R2-1702247, Athens, Greece, Feb. 13-17, (5p).

* cited by examiner

DATA TRANSMISSION METHOD AND APPARATUS, AND COMMUNICATION DEVICE AND STORAGE MEDIUM

CROSS-REFERENCE TO RELATED APPLICATION

The application is a U.S. National Stage of International Application No. PCT/CN2020/096186 filed on Jun. 15, 2020, the entire content of which is incorporated herein by reference for all purposes for all purposes.

TECHNICAL FIELD

The present disclosure relates to the field of wireless communication technology but is not limited to the field of wireless communication technology, and in particular, to a data communication method, apparatus, communication device and storage media.

BACKGROUND

In wireless networks, when there is data to be transmitted, the user equipment (UE) has to listen to the Physical Downlink Control Channel (PDCCH) all the time, resulting in increased power consumption of the UE. At present, Discontinuous Reception (DRX) mechanism is introduced into the communication protocols. The UE listens to the PDCCH during the on duration period in the DRX cycle and does not listen to the PDCCH during the sleep period in the DRX cycle.

To support direct communication between the UE and the UE, a sidelink communication manner is introduced and an interface between the UEs is PC-5.

SUMMARY

In view of this, the embodiments of the present disclosure provide a data communication method, apparatus, communication device and storage medium.

According to a first aspect of the embodiments of the present disclosure, there is provided a data communication method, applied to a first UE, the method including:
according to a discontinuous reception (DRX) parameter of a sidelink determined by a DRX parameter of a Uu port of the first UE, performing data communication with a second UE via the sidelink during an on duration period of the first UE.

According to a second aspect of embodiments of the present disclosure, there is provided a data communication method, applied to a second user equipment (UE), the method including:
according to a discontinuous reception (DRX) parameter of a sidelink determined by a DRX parameter of a Uu port of a first UE, performing data communication with the first UE via the sidelink during an on duration period of the first UE.

According to a third aspect of embodiments of the present disclosure, there is provided a data communication method, applied to a base station, the method including:
receiving at least one set of discontinuous reception (DRX) parameters of a Uu port of a first UE sent by a second UE;
determining a DRX parameter of a sidelink between the first UE and the second UE according to the at least one set of DRX parameters of the Uu port of the first UE.

According to a fourth aspect of an embodiment of the present disclosure, there is provided a data communication apparatus, applied to a first user equipment (UE), the apparatus including: a first transmission module, where
the first transmission module is configured to, according to a discontinuous reception (DRX) parameter of a sidelink determined by a DRX parameter of a Uu port of the first UE, perform data communication with a second UE via the sidelink during an on duration period of the first UE.

According to a fifth aspect of an embodiment of the present disclosure, there is provided a data communication apparatus, applied to a second user equipment (UE), the apparatus including: a second transmission module, where
the second transmission module is configured to, according to a discontinuous reception (DRX) parameter of a sidelink determined by a DRX parameter of a Uu port of a first UE, perform data communication with the first UE via the sidelink during an on duration period of the first UE.

According to a sixth aspect of an embodiment of the present disclosure, there is provided a data communication apparatus, applied to a base station, the apparatus including: a third receiving module and a second determining module, where
the third receiving module is configured to receive at least one set of discontinuous reception (DRX) parameters of a Uu port of a first user equipment (UE) sent by a second UE;
the second determining module is configured to determine a DRX parameter of a sidelink between the first UE and the second UE according to the at least one set of DRX parameters of the Uu port of the first UE.

According to a seventh aspect of an embodiment of the present disclosure, there is provided a communication device, including a processor, a transceiver, a memory and an executable program stored on the memory and capable of being run by the processor, where when the processor runs the executable program, the steps of the data communication method according to the first aspect, the second aspect, or the third aspect are performed.

According to an eighth aspect of an embodiment of the present disclosure, there is provided a storage medium on which an executable program is stored, where when the executable program is executed by a processor, the steps of the data communication method according to the first aspect, the second aspect, or the third aspect are implemented.

It is to be understood that both the foregoing general description and the following detailed description are exemplary and explanatory only and are not restrictive of the embodiments of the present disclosure.

BRIEF DESCRIPTION OF THE DRAWINGS

The accompanying drawings, which are incorporated in and constitute a part of this specification, illustrate embodiments consistent with the embodiments of the present disclosure and, together with the description, serve to explain the principles of the embodiments of the present disclosure.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the present disclosure. Instead, they are merely examples of apparatuses and methods consistent with aspects related to the present disclosure.

The terms used in the embodiments of the present disclosure are only for the purpose of describing specific embodiments, and are not intended to limit the embodiments of the present disclosure. The singular forms of "a", "said" and "the" used in the embodiments of the present disclosure and the appended claims are also intended to include plural forms, unless the context clearly indicates other meanings. It should also be understood that the term "and/or" as used herein refers to and includes any or all possible combinations of one or more associated listed items.

It should be understood that although the terms first, second, third, etc. may be used to describe various information in the embodiments of the present disclosure, the information should not be limited to these terms. These terms are only used to distinguish the same type of information from each other. For example, without departing from the scope of the embodiments of the present disclosure, the first information may also be referred to as second information, and similarly, the second information may also be referred to as first information. Depending on the context, the word "if" as used herein can be interpreted as "when" or "while" or "in response to determination that . . . ".

Figure 1:
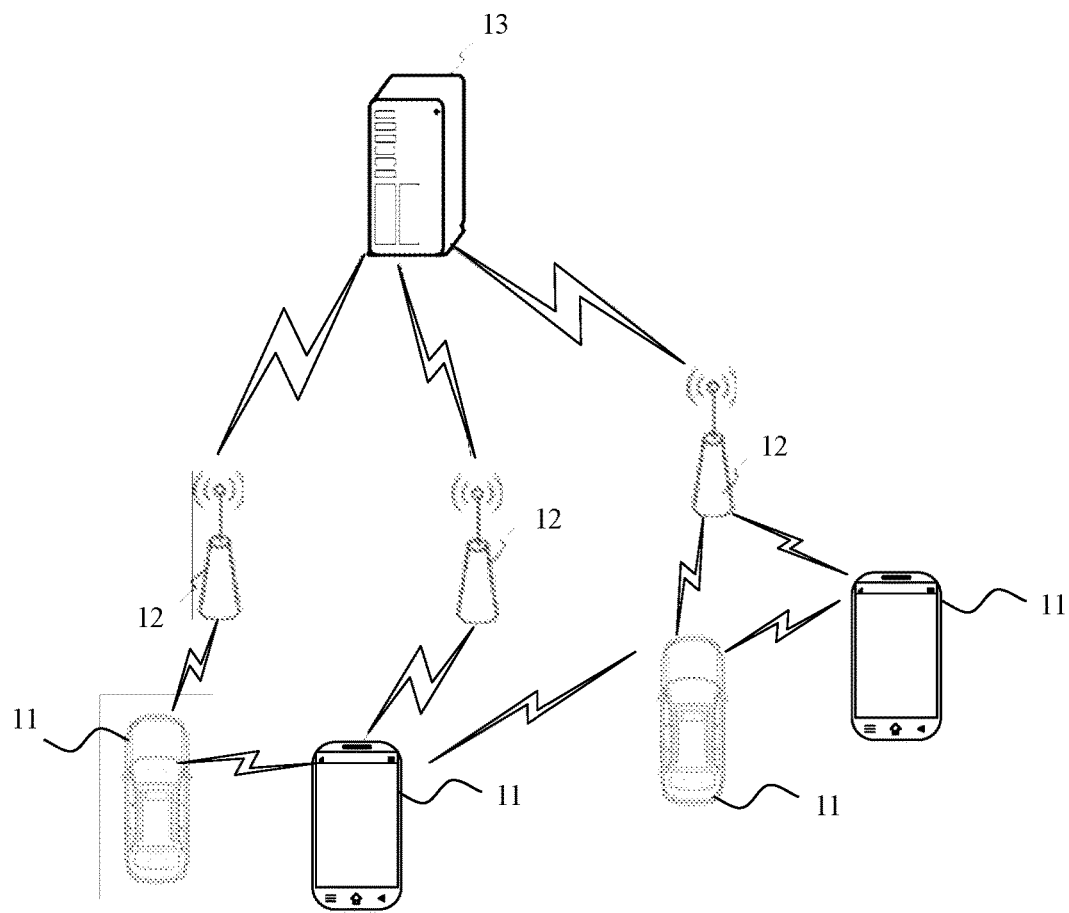
FIG. 1 is a schematic diagram of a structure of a wireless communication system illustrated according to an exemplary embodiment.
Figure 2:
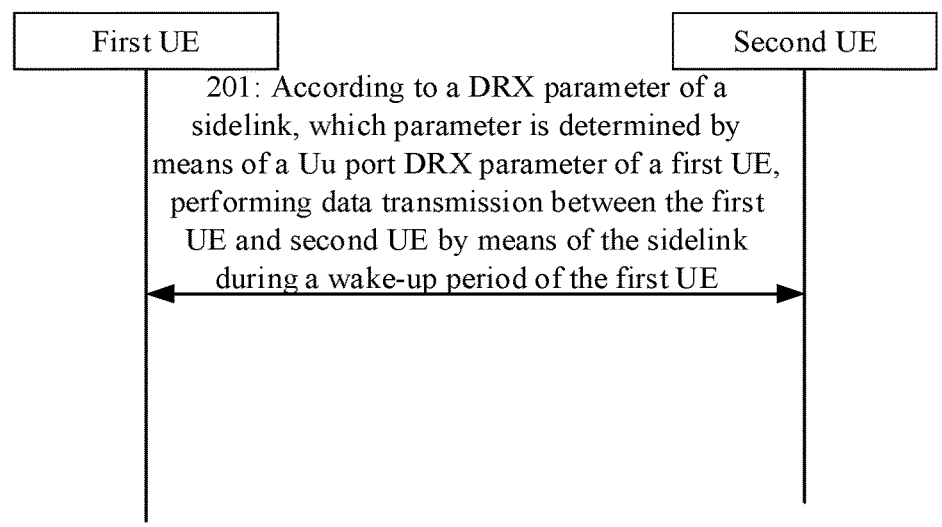
FIG. 2 is a flow diagram of a data communication method illustrated according to an exemplary embodiment.

Referring to FIG. 2, which illustrates a schematic diagram of a structure of a wireless communication system provided by the embodiments of the present disclosure. As shown in FIG. 2, the wireless communication system is a communication system based on cellular mobile communication technology, and the wireless communication system may include: a plurality of terminals 11 and a plurality of base stations 12.

The terminal 11 may be a device providing voice and/or data connectivity to a user. The terminal 11 may communicate with one or more core networks via a Radio Access Network (RAN) and may be an IoT terminal such as a sensor device, a mobile phone (or called "cellular" phone) and a computer with an IoT terminal, for example, it may be a fixed, portable, pocket-sized, handheld, computer-built or vehicle-mounted apparatus, such as a station (STA), a subscriber unit, a subscriber station, a mobile station, a mobile, a remote station, an access point, a remote terminal, an access terminal, a user terminal, a user agent, a user device, or a user equipment (UE). Alternatively, the terminal 11 may be an unmanned aerial vehicle device. Alternatively, the terminal 11 may be an in-vehicle device, for example, a trip computer with wireless communication capabilities or a wireless communication device external to the trip computer. Alternatively, the terminal 11 may be a roadside device, for example, it may be a street light, a signal light or other roadside device with wireless communication capabilities, etc.

The base station 12 may be a network-side device in the wireless communication system. The wireless communication system may be the $4^{th}$ generation mobile communication (4G) system, also known as a Long Term Evolution (LTE) system; or the wireless communication system may be a 5G system, also known as a new radio (NR) system or 5G NR system. Alternatively, the wireless communication system may be a further next generation system of 5G system. The access network in the 5G system may be called New Generation-Radio Access Network (NG-RAN). Or, it may be an MTC system.

The base station 12 may be an evolved base station (eNB) as used in the 4G system. Alternatively, the base station 12 may be a base station (gNB) with a centralized distributed architecture as employed in the 5G system. When the base station 12 adopts the centralized distributed architecture, it typically includes a central unit (CU) and at least two distributed units (DUs). The central unit is provided with protocol stacks of a Packet Data Convergence Protocol (PDCP) layer, a Radio Link Control (RLC) layer and a Media Access Control (MAC) layer; and the distributed unit is provided with a Physical (PHY) layer protocol stack. The specific implementation of the base station 12 is not limited in the embodiments of the present disclosure.

A wireless connection may be established between the base station 12 and the terminal 11 via a wireless air interface. In different implementations, the wireless air interface is a wireless air interface based on the fourth generation mobile communication network technology (4G) standard; or, the wireless air interface is a wireless air interface based on the fifth generation mobile communication network technology (5G) standard, for example, the wireless air interface is a new air interface; or, the wireless air interface may also be a wireless air interface based on the next generation mobile communication network technology standard of 5G.

In some embodiments, End to End (E2E) connection may also be established between the terminals 11, such as vehicle to vehicle (V2V) communication, vehicle to infrastructure (V2I) communication and vehicle to pedestrian (V2P) communication in vehicle to everything (V2X) communication, and other scenarios.

In some embodiments, the above wireless communication system may also include a network management device 13.

Several base stations 12 are respectively connected to the network management device 13. The network management device 13 may be a core network device in the wireless communication system, for example, the network management device 13 may be a Mobility Management Entity (MME) in an Evolved Packet Core (EPC) network. Alternatively, the network management device may be another core network device, such as a Serving GateWay (SGW), a Public Data Network GateWay (PGW), a Policy and Charging Rules Function (PCRF) or a Home Subscriber Server (HSS), etc. The form of implementation of the network management device 13 is not limited in the embodiments of the present disclosure.

The execution subject involved in the embodiments of the present disclosure includes, but is not limited to, a User Equipment (UE) such as a terminal supporting sidelink communication, and a base station for cellular mobile communication, etc.

As shown in FIG. 2, the present exemplary embodiment provides a data communication method. In a first UE of a wireless communication system, the data communication method may include the following steps.

In step 201, according to a DRX parameter of a sidelink determined by a DRX parameter of a Uu port of the first UE, data communication is performed with a second UE via the sidelink during an on duration period of the first UE.

Here, the wireless communication system may be a cellular mobile communication system, such as a 4G cellular mobile communication system or a 5G cellular mobile communication system. The first UE and the second UE may be UEs that access the wireless communication system.

The first UE and the second UE access the wireless communication system via an access network. A sidelink may also be established between the first UE and the second UE to enable direct communication between the UEs.

Here, the first UE may be a data receiver in the sidelink and the second UE may be a data sender in the sidelink. Alternatively, the second UE may be the data receiver in the sidelink and the first UE may be the data sender in the sidelink.

After the first UE accesses the wireless communication system, the DRX communication mechanism of Uu port may be established. The DRX parameter of the DRX communication mechanism of the Uu port may be configured by the base station and sent to the first UE. The DRX parameter of the Uu port is used to configure an on duration period and a sleep period of the first UE in the DRX communication mechanism. During the on duration period, the first UE is in an on duration state and may perform various types of information transmission, for example, it may listen to PUCCH; and during the sleep period, the first UE is in a low power sleep state and generally does not send or receive information, for example, it does not listen to PUCCH, to save energy.

When the UE is in the connected state, the DRX parameter may include: an inactivity timer, an on duration timer, a DRX cycle, a start offset, an uplink HARQ RTT timer, a downlink HARQ RTT timer, an uplink retransmission timer and a downlink retransmission timer, etc. The DRX cycle and start offset may be used to determine a periodic start point of the on duration timer. When the UE receives Downlink Control Information (DCI) carrying its own Cell-RadioNetworkTemporaryIdentifier (C-RNTI) on the PDCCH, the UE may start the inactivity timer. The UE only monitors the PDCCH channel during the on duration period, and the UE may not monitor the PDCCH channel at other times, thus saving power consumption. The on duration period may be determined by the on duration timer, the inactivity timer, the uplink retransmission timer and the downlink retransmission timer.

When the UE is in an idle or inactive state, the UE receives paging information based on the DRX parameter, and the DRX parameter may include: a DRX cycle, a number of paging frames in a DRX cycle, a number of paging occasions contained in each paging frame, a paging frame offset and/or a UE identifier. The paging occasion may be a set of PDCCH monitoring occasions, and the PDCCH monitoring occasions may contain a plurality of time units, such as: a subframe and a slot, etc.

The DRX parameter of the Uu port of the first UE may be used to determine the actual DRX parameter for the sidelink by the UEs at both ends of the sidelink, the base station or the core network, etc. The UEs at both ends of the sidelink perform sidelink communication based on the DRX parameter of the sidelink. The DRX parameter of the sidelink may be used to indicate, for example, an on duration period and/or a sleep period of the first UE on the sidelink. The first UE and the second UE may use the sidelink for data communication during the on duration period on the sidelink of the first UE.

The DRX parameter of the sidelink determined according to the DRX parameter of the Uu port of the first UE may be the same as the DRX parameter of the Uu port of the first UE, such that the on duration period limited by the DRX parameter of the sidelink is the same as the on duration period limited by the DRX parameter of the Uu port. In this way, the shortening of the sleep period due to inconsistencies in the on duration period and/or the sleep period etc. of the UE on the Uu port and on the sidelink can be reduced.

The DRX parameter of the sidelink may also be different from the DRX parameter of the Uu port of the first UE. For example, the on duration period limited by the DRX parameter of the sidelink may be a subset of the on duration period limited by the DRX parameter of the Uu port, or a difference between the on duration period limited by the DRX parameter of the sidelink and the on duration period limited by the DRX parameter of the Uu port may be less than a difference threshold, so that the first UE may be less likely to be woken up by a data communication on the sidelink when the Uu port is in a sleep state, thereby reducing the power consumption. Here, the difference between the on duration period limited by the DRX parameter of the sidelink and the on duration period limited by the DRX parameter of the Uu port may be a difference between the start time and/or the end time of the on duration period limited by the DRX parameter of the sidelink and the start time and/or the end time of the on duration period limited by the DRX parameter of the Uu port.

Exemplarily, for a first UE in a connected state, the DRX parameters such as a DRX cycle, a start offset, an on duration timer, an inactivity timer, and/or an inactivity timer of the DRX communication mechanism of the Uu port of the first UE may be determined as the DRX parameter of the sidelink.

For a first UE in an idle or inactive state, the DRX parameters such as a DRX cycle, a paging frame offset, a number of paging frames in a DRX cycle, a number of paging occasions contained in each paging frame, a paging frame offset, and/or UE identifier of the DRX communication mechanism of the Uu port of the first UE may be determined as the DRX parameter of the sidelink.

In this way, since the DRX parameter of the sidelink is determined based on the DRX parameter of the Uu port of the UE, the on duration period and/or sleep period of the UE in the Uu port and the sidelink can be consistent, thereby reducing the shortening of the sleep period of the UE due to inconsistencies in the on duration period and/or sleep period of the UE in the Uu port and the sidelink, and thus further reducing the power consumption of the UE.

Figure 3:
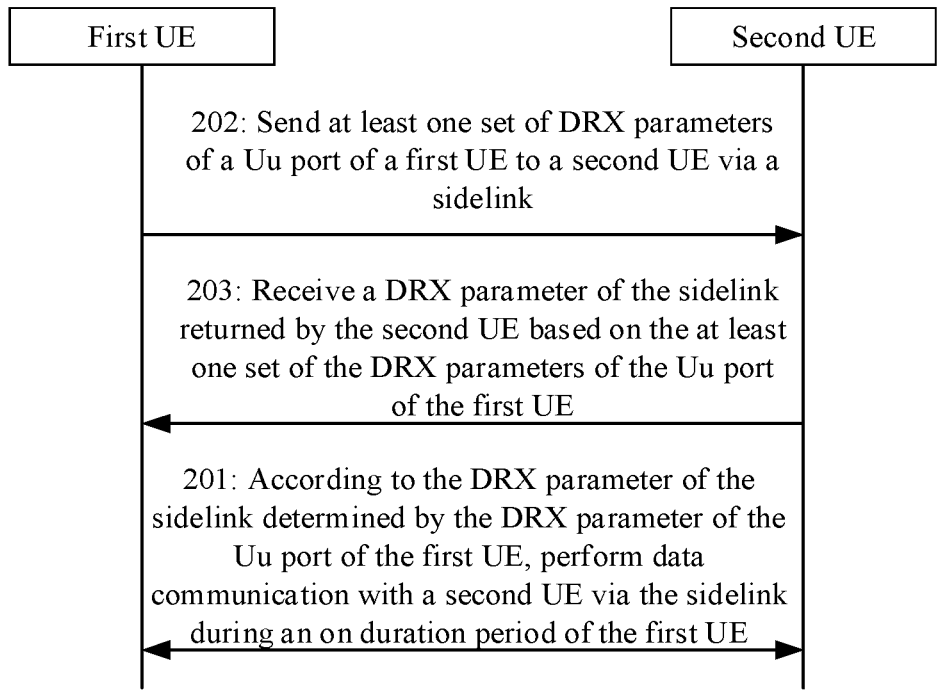
FIG. 3 is a flow diagram of another data communication method according to an exemplary embodiment.

In one embodiment, as shown in FIG. 3, the data communication method may further include the following steps.

In step 202, at least one set of DRX parameters of a Uu port of a first UE is sent to a second UE via a sidelink.

In step 203, a DRX parameter of the sidelink returned by the second UE based on the at least one set of the DRX parameters of the Uu port of the first UE is received.

The first UE may send the at least one set of DRX parameters of the Uu port of the first UE to the second UE for determining the DRX parameter of the sidelink. The DRX parameter of the sidelink may be used for data communication over the sidelink between the first UE and the second UE. The first UE and the second UE may perform data communication during an on duration period indicated according to the DRX parameter of the sidelink.

Here, the first UE may have a plurality sets of DRX parameters of the Uu port, e.g. for the connected state and/or the idle state and/or the inactive state, the first UE may have different DRX parameters of the Uu port, respectively. Here, one set of DRX parameters of the Uu port may also include: DRX parameters for the sleep period or the on duration period, respectively. For example, the DRX parameter for the sleep period may be one set of DRX parameters of Uu port, and the DRX parameters for the on duration period may also be one set of DRX parameters of Uu port.

Here, the DRX parameter of the sidelink may be determined by the second UE, the base station where the second UE resides and the core network. The second UE and the base station where the second UE resides may select one set of DRX parameters of the Uu port from at least one set of DRX parameters of the Uu port as the DRX parameter of the sidelink, or may modify one set of DRX parameters of the Uu port to obtain the DRX parameter of the sidelink. For example, the difference between the on duration period defined by the modified DRX parameter of the sidelink and the on duration period defined by the DRX parameter of the Uu port is less than a difference threshold.

The second UE may be a data sender in the sidelink. The second UE may determine the DRX parameter of the sidelink based on at least one set of the DRX parameters of the Uu port of the first UE.

Exemplarily, the second UE may determine the DRX parameter of the Uu port of the first UE as the DRX parameter of the sidelink, such that the same DRX parameter is used for the Uu port of the first UE and the sidelink, and the sleep period and/or on duration period etc. of the first UE in the Uu port and the sidelink may be the same.

The second UE may also use some of the DRX parameters of the Uu port of the first UE as the DRX parameters of the sidelink, or, the second UE may also modify the DRX parameters of the Uu port of the first UE to obtain the DRX parameter of the sidelink.

The second UE may also send the DRX parameters of the Uu port of the first UE to the base station where the second UE resides, and the base station determines the DRX parameter of the sidelink. The base station may schedule a transmission resource of the sidelink for the second UE. The base station may schedule different transmission resources for the second UE having a plurality of sidelinks at the same time.

Exemplarily, the base station may determine the DRX parameter of the Uu port of the first UE as the DRX parameter of the sidelink between the first UE and the second UE, so that the same DRX parameter is used for the Uu port of the first UE and the sidelink, and the sleep period and/or on duration period of the first UE in the Uu port and the sidelink may be the same.

The base station may also use some of the DRX parameters of the Uu port of the first UE as the DRX parameters of the sidelink, or, the base station may also modify the DRX parameters of the Uu port of the first UE to obtain the DRX parameters of the sidelink.

In this way, the DRX parameters of the sidelink are determined based on the DRX parameters of the Uu port of the UE. In this way, the on duration period and/or the sleep period of the UE in the Uu port and the sidelink may be consistent at the same point in time, thereby reducing the shortened sleep period due to inconsistencies in the on duration and/or sleep period of the Uu port and the sidelink, and thus reducing the power consumption of the UE.

When the second UE is in the connected state, an RRC connection is maintained between the second UE and the base station, and the second UE may send the DRX parameters of the Uu port of the first UE to the base station via this RRC connection, and the base station determines the DRX parameters of the sidelink.

When the second UE is in an idle or inactive state, no RRC connection is established between the second UE and the base station, and the DRX parameters of the sidelink may be determined by the second UE based on the DRX parameters of the Uu port of the first UE. In this way, the power consumption generated by the second UE switching from the idle or inactive state to the connected state and sending the recommended DRX parameter to the base station can be reduced.

In one embodiment, sending at least one set of DRX parameters of the Uu port of the first UE to the second UE via the sidelink, includes:

in response to the first UE being in an idle state or an inactive state, sending the DRX parameters of the Uu port of the first UE used by the first UE to receive a paging message to the second UE via the sidelink.

When the first UE is in the idle or inactive state, the first UE receives the paging message based on the DRX parameters, and the DRX parameters of the Uu port used by the first UE to receive the paging message may include: a DRX cycle, a number of paging frames in a DRX cycle, a number of paging occasions contained in each paging frame, a paging frame offset, a UE identifier, etc. The paging occasion is a set of PDCCH monitoring occasions, and the PDCCH monitoring occasions may contain a plurality of time units, such as: a subframe and a slot.

The first UE may send the DRX parameters of the Uu port used by the first UE to receive the paging message: a DRX cycle, a paging frame offset, a number of paging frames in a DRX cycle, a number of paging occasions contained in each paging frame, a paging frame offset, and/or a UE identifier, etc., to the second UE via the sidelink for determining the DRX parameters of the sidelink when the first UE is in the idle or inactive state. In this way, the on duration period and/or the sleep period of the first UE in the idle or inactive state can be consistent in the Uu port and the sidelink, thereby reducing the incorrect wake-up of the first UE due to inconsistencies in the on duration period and/or the sleep period etc. in the Uu port and the sidelink, and thus reducing the power consumption of the UE.

In one embodiment, the DRX parameters of the Uu port used by the first UE to receive the paging message includes: a DRX cycle, a paging frame offset, a number of paging frames in a DRX cycle, a number of paging occasions contained in each paging frame, an identifier of the first UE, a frame identifier of a paging frame and/or a subframe identifier of a paging frame.

The frame identifier of the paging frame and/or the subframe identifier of the paging frame is used to determine the on duration period of the first UE.

When the UE is in an idle or inactive state, the sleep period and/or the on duration period of the UE may be determined based on the DRX cycle, the paging frame offset, the number of paging frames in the DRX cycle, the number of paging occasions contained in each paging frame, the identifier of the first UE, the frame identifier of the paging frame and/or the subframe identifier of the paging frame.

When the UE is in the idle or inactive state, the UE determines the paging frame according to expression (1):

$$(SFN + \text{PF\_offset}) \bmod T = (T \text{ div } N) * (\text{UE\_ID} \bmod N) \quad (1)$$

where SFN denotes the system frame number, i.e. a current frame number of the UE, PF_offset denotes the paging frame offset, T denotes the DRX cycle, N denotes the number of paging frames and UE_ID denotes the UE identifier, which can be obtained by modulo IMSI of the UE by 1024.

The frame identifier of the paging frame may be expressed as: (T div N)*(UE_ID mod N), where T div N represents an integer quotient obtained by dividing the DRX cycle by the number of paging frames in the cycle; UE_ID mod N represents a remainder obtained by dividing the UE identifier by the number of paging frames in the DRX cycle. The frame identifier of the paging frame may be used to determine the frame in which the paging occasion is located and thus the on duration period of the UE.

The subframe identifier is one or more subframe numbers, and is the number of the subframe in which the paging occasion is located. The on duration period of the UE may be determined based on the number of the subframe in which the paging occasion is located.

The second UE, or the base station where the second UE resides, may determine the on duration period of the Uu port of the first UE based on the frame identifier of the paging frame and/or the subframe identifier of the paging frame, which in turn may determine the DRX parameter of the sidelink.

When the second UE sends the DRX parameters of the Uu port of the first UE, it may also carry the identifier of the first UE. The second UE may have a plurality of sidelinks at the same time. When determining a target DRX parameter, the second UE may determine a sidelink corresponding to the recommended DRX parameter according to the identifier of the first UE, and thus determine the target DRX parameter corresponding to that sidelink. This reduces the incorrect assignment of the target DRX parameter due to the inability to distinguish between different sidelinks.

When the second UE sends the DRX parameters of the Uu port of the first UE, it may also carry identifier information of the sidelink. The identifier information of the sidelink may include, for example, an index of the sidelink, and the index may be used to point to one sidelink identifier in the destination address of the sidelink reported by the second UE. When the second UE sends the recommended DRX parameter, it may also send the index, and the base station may determine the sidelink between the first UE and the second UE based on the index and configure the DRX parameter of the sidelink.

The second UE may send the determined DRX parameter of the sidelink to the first UE. The first UE switches between a sleep state and an on duration state during the DRX cycle based on the DRX parameter of the sidelink. In the on duration state, data communication is performed with the second UE via the sidelink.

The second UE may determine the on duration period of the first UE according to the target DRX parameter and perform data communication with the first UE during the active and on duration periods of the first UE.

In one embodiment, in response to the first UE being in a connected state, the DRX parameters of the Uu port of the first UE includes:

a DRX cycle, a DRX cycle start offset, an on duration timer, an inactivity timer, an inactivity timer, an uplink hybrid automatic retransmission request round trip time (HARQ RTT) timer, a downlink HARQ RTT timer, an uplink retransmission timer and/or a downlink retransmission timer.

When the UE is in the connected state, the sleep period and/or on duration period of the UE in the connected state may be determined according to the DRX cycle, the DRX cycle start offset, the on duration timer, the inactivity timer, the inactivity timer, the uplink hybrid automatic retransmission request round trip time (HARQ RTT) timer, the downlink HARQ RTT timer, the uplink retransmission timer and/or the downlink retransmission timer, etc.

Figure 4:
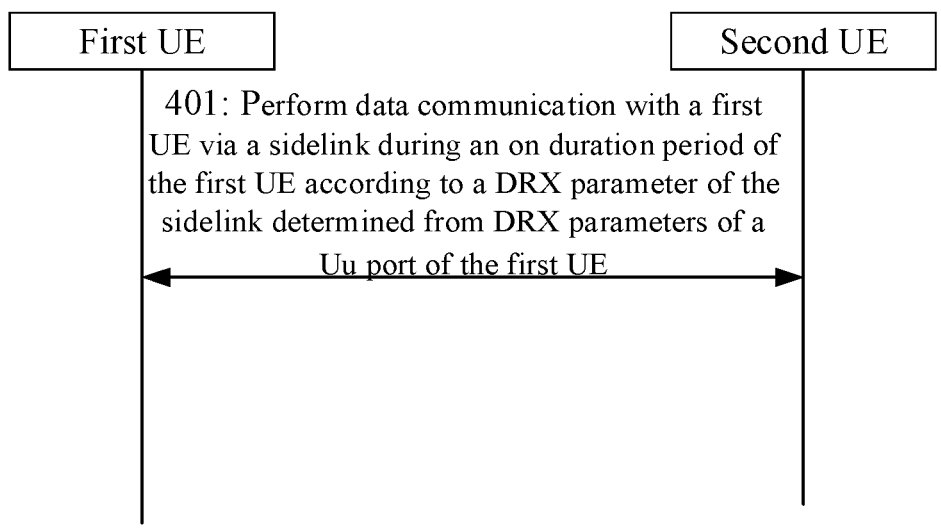
FIG. 4 is a flow diagram of yet another data communication method according to an exemplary embodiment.

As shown in FIG. 4, this exemplary embodiment provides a data communication method. In the second UE of the wireless communication system, the data communication method may include the following steps.

In step 401, data communication is performed with a first UE via a sidelink during an on duration period of the first UE according to a DRX parameter of the sidelink determined from DRX parameters of a Uu port of the first UE.

Here, the wireless communication system may be a cellular mobile communication system, such as a 4G cellular mobile communication system or a 5G cellular mobile communication system, etc. The first UE and the second UE may be UEs that access the wireless communication system.

The first UE and the second UE access the wireless communication system via an access network. A sidelink may also be established between the first UE and the second UE to enable direct communication between the UEs.

After the first UE accesses the wireless communication system, the DRX communication mechanism of Uu port may be established. The DRX parameters of the DRX communication mechanism of the Uu port may be configured by the base station and sent to the first UE. The DRX parameters of the Uu port are used to configure the on duration period and the sleep period of the first UE in the DRX communication mechanism, etc. During the on duration period, the first UE is in the on duration state and may perform various types of information transmission, for example, it may listen to PUCCH; during the sleep period, the first UE is in the low power sleep state and generally does not send or receive information, for example, it does not listen to PUCCH, to save energy.

When the UE is in the connected state, the DRX parameters may include: an inactivity timer, an on duration timer, a DRX cycle, a start offset, an uplink HARQ RTT timer, a downlink HARQ RTT timer, an uplink retransmission timer and a downlink retransmission timer, etc. The DRX cycle and start offset may be used to determine a periodic start point of the on duration timer. The UE may start the inactivity timer when it receives Downlink Control Information (DCI) carrying its own Cell-RadioNetworkTemporaryIdentifier (C-RNTI) on the PDCCH. The UE only monitors the PDCCH channel during the on duration period, and the UE may not monitor the PDCCH channel at other times, thus saving power consumption. The on duration period may be determined by the on duration timer, the inactivity timer, the uplink retransmission timer and the downlink retransmission timer.

When the UE is in an idle or inactive state, the UE receives paging information based on the DRX parameters, and the DRX parameters may include: a DRX cycle, a number of paging frames in a DRX cycle, a number of paging occasions contained in each paging frame, a paging frame offset and/or a UE identifier. The paging occasion may be a set of PDCCH monitoring occasions, and the PDCCH monitoring occasion may contain a plurality of time units, such as: a subframe and a slot, etc.

The DRX parameters of the Uu port of the first UE may be used to determine the actual DRX parameter for the sidelink by the UEs at both ends of the sidelink, the base station or the core network, etc. The UEs at both ends of the sidelink perform sidelink communication based on the DRX parameter of the sidelink. The DRX parameter of the sidelink may be used to indicate, for example, an on duration period and/or a sleep period of the first UE on the sidelink. The first UE and the second UE may use the sidelink for data communication during the on duration period on the sidelink of the first UE.

The DRX parameter of the sidelink determined according to the DRX parameter of the Uu port of the first UE may be the same as the DRX parameter of the Uu port of the first UE, such that the on duration period limited by the DRX parameter of the sidelink is the same as the on duration period limited by the DRX parameter of the Uu port. In this way, the shortening of the sleeping period due to inconsistencies in the on duration period and/or the sleeping period etc. of the UE on the Uu port and on the sidelink can be reduced.

The DRX parameter of the sidelink may also be different from the DRX parameter of the Uu port of the first UE. For example, the on duration period limited by the DRX parameter of the sidelink may be a subset of the on duration period limited by the DRX parameter of the Uu port, or a difference between the on duration period limited by the DRX parameter of the sidelink and the on duration period limited by the DRX parameter of the Uu port may be less than a difference threshold, so that the probability that the first UE is awakened by the data communication on the sidelink when the Uu port is in the sleep state can be reduced, thereby reducing the power consumption. Here, the difference between the on duration period limited by the DRX parameter of the sidelink and the on duration period limited by the DRX parameters of the Uu port may be a difference between the start time and/or the end time of the on duration period limited by the DRX parameter of the sidelink and the start time and/or the end time of the on duration period limited by the DRX parameter of the Uu port.

The first UE may use the on duration period and/or sleep period etc. in the DRX communication mechanism of the Uu port for the sidelink such that the on duration period and/or sleep period etc. of the Uu port of the first UE is consistent with that of the sidelink of the first UE. Exemplarily, for the first UE in the connected state, the DRX parameters such as the DRX cycle, start offset, on duration timer, inactivity timer, and/or inactivity timer of the DRX communication mechanism of the Uu port of the first UE may be determined as the DRX parameters of the sidelink.

For the first UE in an idle or inactive state, the DRX parameters such as the DRX cycle, the paging frame offset, the number of paging frames in the DRX cycle, the number of paging occasions contained in each paging frame, the paging frame offset, and/or the UE identifier of the DRX communication mechanism of the Uu port of the first UE may be determined as the DRX parameters of the sidelink.

In this way, since the DRX parameters of the sidelink are determined according to the DRX parameters of the Uu port of the UE, the on duration period and/or sleep period of the UE on the Uu port and on the sidelink can be kept consistent, thereby reducing the shortening of the sleep period of the UE due to inconsistencies in the on duration period and/or sleep period, etc., on the Uu port and on the sidelink, and thereby further reducing the power consumption of the UE.

Figure 5:
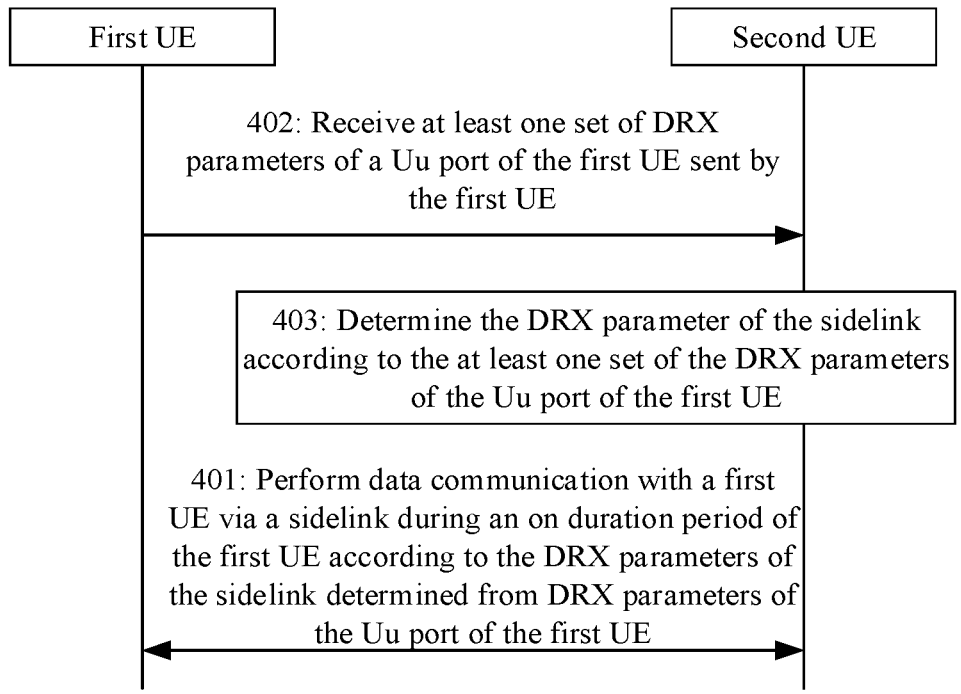
FIG. 5 is a flow diagram of a further data communication method according to an exemplary embodiment.

In one embodiment, as shown in FIG. 5, determining the DRX parameter of the sidelink according to the discontinuous reception (DRX) parameter of the Uu port of the first UE may include the following steps.

In step 402: at least one set of DRX parameters of a Uu port of the first UE sent by the first UE is received.

In step 403: the DRX parameter of the sidelink is determined according to the at least one set of the DRX parameters of the Uu port of the first UE.

The first UE may send the at least one set of DRX parameters of the Uu port of the first UE to the second UE for determining the DRX parameter of the sidelink. The DRX parameter of the sidelink may be used for data communication over the sidelink between the first UE and the second UE. The first UE and the second UE may perform data communication during an on duration period indicated according to the DRX parameter of the sidelink.

Here, the first UE may have a plurality sets of DRX parameters of the Uu port, e.g. for the connected state and/or the idle state and/or the inactive state, the first UE may have different DRX parameters of the Uu port, respectively. Here, one set of DRX parameters of the Uu port may also include: DRX parameters for the sleep period or the on duration period, respectively. For example, the DRX parameters for the sleep period may be one set of DRX parameters of Uu port, and the DRX parameters for the on duration period may also be one set of DRX parameters of Uu port.

Here, the DRX parameter of the sidelink may be determined by the second UE, a base station where the second UE resides and a core network. The second UE and the base station where the second UE resides may select one set of DRX parameters of the Uu port from at least one set of DRX parameters of the Uu port as the DRX parameter of the sidelink, or one set of DRX parameters of the Uu port may be modified to obtain the DRX parameter of the sidelink. For example, a difference between the on duration period defined by the modified DRX parameters of the sidelink and the on duration period defined by the DRX parameters of the Uu port is less than a difference threshold.

The second UE may be a data sender in the sidelink. The second UE may determine the DRX parameters of the sidelink based on at least one set of DRX parameters of the Uu port of the first UE.

Exemplarily, the second UE may determine the DRX parameters of the Uu port of the first UE as the DRX parameters of the sidelink, such that the same DRX parameters are used for the Uu port and the sidelink of the first UE, and the sleep period and/or on duration period etc. of the first UE in the Uu port and the sidelink may be the same.

The second UE may also use some of the DRX parameters of the Uu port of the first UE as DRX parameters of the sidelink. Alternatively, the second UE may also modify the DRX parameters of the Uu port of the first UE to obtain DRX parameters of the sidelink.

In this way, the DRX parameters of the sidelink are determined based on the DRX parameters of the Uu port of the UE. This enables the UE to maintain the same on duration period and/or sleep period in the Uu port and the sidelink at the same point in time, thereby reducing the shortening of the sleep period due to inconsistencies in the on duration period and/or sleep period, etc., between the Uu port and the sidelink, and thereby reducing the power consumption of the UE.

In one embodiment, determining the DRX parameters of the sidelink according to at least one set of DRX parameters of the Uu port of the first UE, includes:

sending at least one set of DRX parameters of the Uu port of the first UE to a base station where the second UE resides;

receiving DRX parameters of the sidelink returned by the base station based on the at least one set of DRX parameters of the Uu port of the first UE.

The second UE may also send the DRX parameters of the Uu port of the first UE to the base station where the second UE resides, and the base station determines the DRX parameters of the sidelink. The base station may schedule a transmission resource of the sidelink for the second UE. In case the second UE has a plurality of sidelinks at the same time, the base station may schedule different transmission resources.

Exemplarily, the base station may determine the DRX parameters of the Uu port of the first UE as the DRX parameters of the sidelink between the first UE and the second UE, such that the same DRX parameters are used for the Uu port of the first UE and the sidelink, and the sleep period and/or on duration period etc. of the first UE in the Uu port and the sidelink may be the same.

The base station may also use some of the DRX parameters of the Uu port of the first UE as the DRX parameters of the sidelink, or, the base station may also modify the DRX parameters of the Uu port of the first UE to obtain the DRX parameters of the sidelink.

In this way, the DRX parameters of the sidelink are determined based on the DRX parameters of the Uu port of the UE. This allows the UE to maintain the same on duration and/or sleep period in the Uu port and the sidelink at the same point in time, thereby reducing the shortening of the sleep period due to inconsistencies in the on duration and/or sleep periods of the Uu port and the sidelink, and thus reducing the power consumption of the UE.

In one embodiment, sending at least one set of DRX parameters of the Uu port of the first UE to the base station where the second UE resides, includes:

sending, in response to the second UE being in the connected state, at least one set of DRX parameters of the Uu port of the first UE to the base station.

When the second UE is in the connected state, an RRC connection is maintained between the second UE and the base station, and the second UE may send the DRX parameters of the Uu port of the first UE to the base station via this RRC connection, and then the base station determines the DRX parameters of the sidelink.

In one embodiment, sending at least one set of DRX parameters of the Uu port of the first UE to the base station where the second UE resides, includes:

sending to the base station at least one set of DRX parameters of the Uu port of the first UE, and a sidelink identifier and/or identifier information of the sidelink of the first UE; where the sidelink identifier and/or identifier information of the sidelink of the first UE is used for the base station to determine the sidelink.

The second UE may carry the identifier of the first UE when sending the DRX parameters of the Uu port of the first UE. The second UE may have more than one sidelink at the same time. When determining a target DRX parameter, the second UE may determine the sidelink corresponding to the recommended DRX parameter based on the identifier of the first UE, and thus determine the target DRX parameter corresponding to that sidelink. This reduces the incorrect assignment of the target DRX parameter due to the inability to distinguish between different sidelinks.

When the second UE sends the DRX parameters of the Uu port of the first UE, it may also carry the identifier information of the sidelink. The identifier information of the sidelink may include, for example, an index of the sidelink, which may be used to point to one sidelink identifier in a destination address of the sidelink reported by the second UE. When the second UE sends the recommended DRX parameters, it may also send the index, and the base station may determine the sidelink between the first UE and the second UE based on the index and configure the DRX parameters of the sidelink.

In one embodiment, determining the DRX parameters of the sidelink based on at least one set of DRX parameters of the Uu port of the first UE, includes:

in response to the second UE being in an idle or inactive state, determining, by the second UE, the DRX parameter of the sidelink according to the at least one set of DRX parameters of the Uu port of the first UE.

When the second UE is in the idle or inactive state, no RRC connection is established between the second UE and the base station, and the DRX parameters of the sidelink may be determined by the second UE based on the DRX parameters of the Uu port of the first UE. In this way, the power consumption generated by the second UE switching from the idle or inactive state to the connected state and sending the recommended DRX parameter to the base station can be reduced.

In one embodiment, in response to the first UE being in the idle or inactive state, the DRX parameters of the Uu port of the first UE include: a DRX cycle, a paging frame offset, a number of paging frames in a DRX cycle, a number of paging occasions contained in each paging frame, an identifier of the first UE, a frame identifier of a paging frame and/or a subframe identifier of a paging frame; where the frame identifier of the paging frame and/or the subframe identifier of the paging frame are used for determining the on duration period of the first UE.

When the UE is in an idle or inactive state, the sleep period and/or the on duration period of the UE may be determined according to the DRX cycle, the paging frame offset, the number of paging frames in the DRX cycle, the number of paging occasions contained in each paging frame, the identifier of the first UE, the frame identifier of the paging frame and/or the subframe identifier of the paging frame.

When the first UE is in the idle state or inactive state, the first UE receives the paging message based on the DRX parameters, and the DRX parameters of the Uu port used by the first UE to receive the paging message may include: a DRX cycle, a number of paging frames in a DRX cycle, a number of paging occasions contained in each paging frame, a paging frame offset, a UE identifier, etc. The paging occasion is a set of PDCCH monitoring occasions, and the PDCCH monitoring occasions may contain a plurality of time units, such as: a subframe and a slot, etc.

The first UE may send the DRX parameters of the Uu port used by the first UE to receive the paging message: the DRX cycle, the paging frame offset, the number of paging frames in the DRX cycle, the number of paging occasions contained in each paging frame, the paging frame offset, and/or the UE identifier, etc., to the second UE via the sidelink for determining the DRX parameters of the sidelink when the first UE is in the idle or inactive state. In this way, the on duration and/or sleep periods of the first UE in the idle or inactive state can be kept consistent in the Uu port and the sidelink, thereby reducing the incorrect wake-up of the first UE due to inconsistencies in the on duration and/or sleep periods of the Uu port and the sidelink, and thus reducing the power consumption of the UE.

When the UE is in the idle or inactive state, the UE determines the paging frame according to expression (1); where SFN denotes the system frame number, i.e. the frame number of the current UE PF_offset denotes the paging frame offset, T denotes the DRX cycle, N denotes the number of paging frames, and UE_ID denotes the UE identifier, which may be obtained by modulo IMSI of the UE by 1024.

The frame identifier of the paging frame may be expressed as: (T div N)*(UE_ID mod N) (T div N)*(UE_ID mod N), where T div N represents the integer quotient obtained by dividing the DRX cycle by the number of paging frames in the cycle; UE_ID mod N represents the remainder obtained by dividing the UE identifier by the number of paging frames in the DRX cycle. The frame identifier of the paging frame may be used to determine the frame in which the paging occasion is located and thus to determine the on duration period of the UE.

The subframe identifier is one or more subframe numbers, which is the subframe in which the paging occasion is located. The on duration period of the UE may be determined based on the number of the subframe in which the paging occasion is located.

The second UE or the base station where the second UE resides may determine the on duration period of the Uu port of the first UE based on the frame identifier of the paging frame and/or the subframe identifier of the paging frame, which in turn may determine the DRX parameters of the sidelink.

In one embodiment, in response to the first UE being in a connected state, the DRX parameters of the Uu port of the first UE includes:
  a DRX cycle, a DRX cycle start offset, a wakeup timer, an inactivity timer, an inactivity timer, an uplink hybrid automatic retransmission request round trip time (HARQ RTT) timer, a downlink HARQ RTT timer, an uplink retransmission timer and/or a downlink retransmission timer.

When the UE is in the connected state, the sleep period and/or on duration period of the UE in the connected state may be determined according to the DRX cycle, the DRX cycle start offset, the on duration timer, the inactivity timer, the inactivity timer, the uplink hybrid automatic retransmission request round trip time (HARQ RTT) timer, the downlink HARQ RTT timer, the uplink retransmission timer and/or the downlink retransmission timer.

In one embodiment, the data communication method may further include:
  sending the DRX parameters of the sidelink to the first UE.

The second UE may send the determined DRX parameters of the sidelink to the first UE. The first UE switches between a sleep state and an on duration state during the DRX cycle based on the DRX parameters of the sidelink. In the on duration state, data communication is performed with the second UE via the sidelink.

The second UE may determine the on duration period of the first UE according to the target DRX parameters and perform data communication with the first UE during the active and on duration periods of the first UE.

Figure 6:
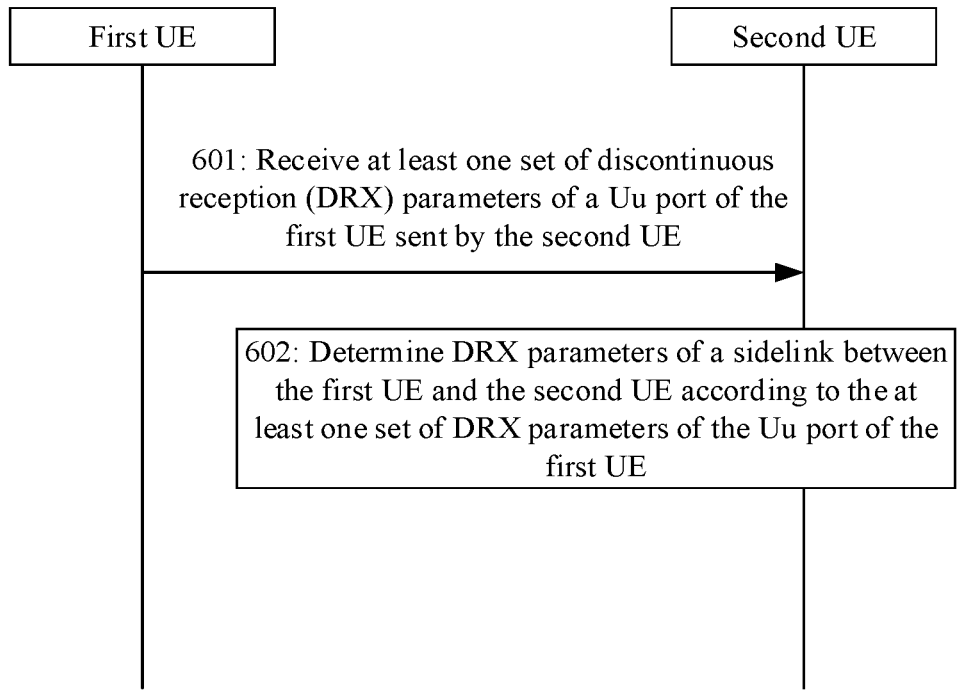
FIG. 6 is a flow diagram of a further data communication method according to an exemplary embodiment.

As shown in FIG. 6, this exemplary embodiment provides a data communication method. In a base station of a wireless communication system, the data communication method may include the following steps.

In step 601: at least one set of DRX parameters of a Uu port of the first UE sent by the second UE is received.

In step 602: DRX parameters of a sidelink between the first UE and the second UE are determined according to the at least one set of DRX parameters of the Uu port of the first UE.

Here, the wireless communication system may be a cellular mobile communication system, such as a 4G cellular mobile communication system or a 5G cellular mobile communication system, or other evolved communication system, etc. The first UE and the second UE may be UEs that access the wireless communication system.

The first UE and the second UE access the wireless communication system via an access network. A sidelink may also be established between the first UE and the second UE to enable direct communication between the UEs.

Here, the first UE may be a data receiver in the sidelink and the second UE may be a data sender in the sidelink. Alternatively, the second UE may be the data receiver in the sidelink and the first UE may be the data sender in the sidelink.

After the first UE accesses the wireless communication system, a DRX communication mechanism of the Uu port may be established. The DRX parameters of the DRX communication mechanism of the Uu port may be configured by the base station and sent to the first UE. The DRX parameters of the Uu port are used to configure the on duration period and sleep period of the first UE in the DRX communication mechanism, etc. During the on duration period, the first UE is in the on duration state and can perform various types of information transmission, for example, it can listen to PUCCH; during the sleep period, the first UE is in the low power sleep state and generally does not send or receive information, for example, it does not listen to PUCCH, to save energy.

When the UE is in the connected state, the DRX parameters may include: an inactivity timer, an on duration timer, a DRX cycle, a start offset, an uplink HARQ RTT timer, a downlink HARQ RTT timer, an uplink retransmission timer and a downlink retransmission timer, etc. The DRX cycle and start offset may be used to determine the periodic start time point of the on duration timer. The UE starts the inactivity timer when it receives Downlink Control Information (DCI) carrying its own Cell-RadioNetworkTemporaryIdentifier (C-RNTI) on the PDCCH. The UE only monitors the PDCCH channel during the on duration period, and does not monitor the PDCCH channel at other times so as to save the power consumption. The on duration period may be determined by the on duration timer, the inactivity timer, the uplink retransmission timer and the downlink retransmission timer.

When the UE is in an idle or inactive state, the UE receives paging information based on the DRX parameters, and the DRX parameters may include: a DRX cycle, a number of paging frames in a DRX cycle, a number of paging occasions contained in each paging frame, a paging frame offset and/or a UE identifier. The paging occasion may be a set of PDCCH monitoring occasions, and the PDCCH monitoring occasions may contain a plurality of time units, such as: a subframe and a slot, etc.

The DRX parameters of the Uu port of the first UE may be used to determine the actual DRX parameters for the sidelink by the UEs at both ends of the sidelink, the base station or the core network, etc. The UEs at both ends of the sidelink performs sidelink communication based on the DRX parameters of the sidelink. The DRX parameters of the sidelink may be used to indicate, for example, an on duration period and/or a sleep period of the first UE on the sidelink. The first UE and the second UE may use the sidelink for data communication during the on duration period on the sidelink of the first UE.

The DRX parameters of the sidelink determined according to the DRX parameters of the Uu port of the first UE may be the same as the DRX parameters of the Uu port of the first UE, such that the on duration period limited by the DRX parameters of the sidelink is the same as the on duration period limited by the DRX parameters of the Uu port. In this way, the shortening of the sleep period due to inconsistencies in the on duration period and/or the sleep period etc. of the UE on the Uu port and on the sidelink can be reduced.

The DRX parameters of the sidelink may also be different from the DRX parameters of the Uu port of the first UE. For example, the on duration period limited by the DRX parameters of the sidelink may be a subset of the on duration period limited by the DRX parameters of the Uu port, or a difference between the on duration period limited by the DRX parameters of the sidelink and the on duration period limited by the DRX parameters of the Uu port may be less than a difference threshold, so that the first UE may be less likely to be woken up by a data communication on the sidelink when the Uu port is asleep, thereby reducing the power consumption. Here, the difference between the on duration period limited by the DRX parameters of the sidelink and the on duration period limited by the DRX parameters of the Uu port may be a difference between the start time and/or the end time of the on duration period limited by the DRX parameters of the sidelink and the start time and/or the end time of the on duration period limited by the DRX parameters of the Uu port.

The first UE may use the on duration period and/or sleep period etc. in the DRX communication mechanism of the Uu port for the sidelink such that the on duration period and/or sleep period etc. of the Uu port of the first UE and the sidelink of the first UE coincide. Exemplarily, for the first UE in the connected state, the DRX parameters such as a DRX cycle, a start offset, an on duration timer, an inactivity timer, and/or an inactivity timer of the DRX communication mechanism of the Uu port of the first UE may be determined as DRX parameters of the sidelink.

For the first UE in the idle or inactive state, the DRX parameters such as the DRX cycle, the paging frame offset, the number of paging frames in the DRX cycle, the number of paging occasions contained in each paging frame, the paging frame offset, and/or the UE identifier of the DRX communication mechanism of the Uu port of the first UE may be determined as the DRX parameters of the sidelink.

The second UE may send the DRX parameters of the Uu port of the first UE to the base station where the second UE resides, and the base station determines the DRX parameters of the sidelink. The base station may schedule a transmission resource of the sidelink for the second UE. For the second UE having a plurality of sidelinks at the same time, the base station may schedule different transmission resources.

Exemplarily, the base station may determine the DRX parameters of the Uu port of the first UE as the DRX parameters of the sidelink between the first UE and the second UE, so that the same DRX parameters are used for the Uu port of the first UE and the sidelink, and the sleep and/or on duration periods of the first UE in the Uu port and the sidelink may be the same.

The base station may also use some of the DRX parameters of the Uu port of the first UE as the DRX parameters of the sidelink, or, the base station may also modify the DRX parameters of the Uu port of the first UE to obtain the DRX parameters of the sidelink.

In this way, since the DRX parameters of the sidelink are determined according to the DRX parameters of the Uu port of the UE, the on duration period and/or the sleep period can be consistent in the UE at the Uu port and the sidelink, thereby reducing the shortening of the sleep period due to inconsistencies in the on duration period and/or the sleep period, etc., of the UE at the Uu port and at the sidelink, and thus the power consumption of the UE can be further reduced.

In one embodiment, in response to the first UE being in an idle state or an inactive state, the DRX parameters of the Uu port of the first UE include: a DRX cycle, a paging frame offset, a number of paging frames in a DRX cycle, a number of paging occasions contained in each paging frame, an identifier of the first UE, a frame identifier of a paging frame and/or a subframe identifier of a paging frame; where the frame identifier of the paging frame and/or the subframe identifier of the paging frame are used for determining the on duration period of the first UE.

When the UE is in an idle or inactive state, the sleep period and/or the on duration period of the UE may be determined according to the DRX cycle, the paging frame offset, the number of paging frames in the DRX cycle, the number of paging occasions contained in each paging frame, the identifier of the first UE, the frame identifier of the paging frame and/or the subframe identifier of the paging frame.

When the first UE is in the idle state or inactive state, the first UE receives the paging information based on the DRX parameters, and the DRX parameters of the Uu port used by the first UE to receive the paging message may include: a DRX cycle, a number of paging frames in a DRX cycle, a number of paging occasions contained in each paging frame, a paging frame offset, a UE identifier, etc. The paging occasion is a set of PDCCH monitoring occasions, and the PDCCH monitoring occasions may contain a plurality of time units, such as: subframes and slots, etc.

The first UE may send the DRX parameters of the Uu port used by the first UE to receive the paging message: a DRX cycle, a paging frame offset, a number of paging frames in a DRX cycle, a number of paging occasions contained in each paging frame, a paging frame offset, and/or a UE identifier, etc., to the second UE via the sidelink for determining the DRX parameters of the sidelink when the first UE is in the idle or inactive state. In this way, the on duration and/or sleep periods of the first UE in the idle or inactive state can be kept consistent in the Uu port and the sidelink, thereby reducing the incorrect wake-up of the first UE due to inconsistencies in the on duration and/or sleep periods of the Uu port and the sidelink, and thus reducing the power consumption of the UE.

When the UE is in the idle or inactive state, the UE determines the paging frame according to expression (1); where SFN denotes the system frame number, i.e. the frame number of the current UE PF_offset denotes the paging frame offset, T denotes the DRX cycle, N denotes the number of paging frames and UE_ID denotes the UE identifier, which can be obtained by modulo IMSI of the UE by 1024.

The frame identifier of the paging frame can be expressed as: (T div N)*(UE_ID mod N), where T div N represents the integer quotient obtained by dividing the DRX cycle by the number of paging frames in the cycle; UE_ID mod N represents the remainder obtained by dividing the UE identifier by the number of paging frames in the DRX cycle. The frame identifier of the paging frame may be used to determine the frame in which the paging occasion is located and thus determine the on duration period of the UE.

The subframe identifier is one or more subframe numbers, which is the number of the subframe(s) in which the paging occasion is located. The on duration period of the UE may be determined based on the number of the subframe(s) in which the paging occasion is located.

The second UE or the base station where the second UE resides may determine the on duration period of the Uu port of the first UE based on the frame identifier of the paging frame and/or the subframe identifier of the paging frame, which in turn may determine the DRX parameters of the sidelink.

In one embodiment, in response to the first UE being in a connected state, the DRX parameters of the Uu port of the first UE include:

a DRX cycle, a DRX cycle start offset, an on duration timer, an inactivity timer, an inactivity timer, an uplink hybrid automatic retransmission request round trip time (HARQ RTT) timer, a downlink HARQ RTT timer, an uplink retransmission timer and/or a downlink retransmission timer.

When the UE is in the connected state, the sleep period and/or on duration period of the UE in the connected state may be determined according to the DRX cycle, the DRX cycle start offset, the on duration timer, the inactivity timer, the inactivity timer, the uplink hybrid automatic retransmission request round trip time (HARQ RTT) timer, the downlink HARQ RTT timer, the uplink retransmission timer and/or the downlink retransmission timer.

In one embodiment, the data communication method may further include:

determining a sidelink according to a sidelink identifier and/or identifier information of the sidelink of the first UE sent by the second UE.

The second UE may also carry the identifier of the first UE when sending the DRX parameters of the Uu port of the first UE. The second UE may have more than one sidelink at the same time. When determining a target DRX parameter, the second UE may determine the sidelink corresponding to a recommended DRX parameter according to the identifier of the first UE, and thus determine the target DRX parameter corresponding to that sidelink. This reduces the incorrect assignment of the target DRX parameter due to the inability to distinguish between different sidelinks.

When the second UE sends the DRX parameters of the Uu port of the first UE, it may also carry the identifier information of the sidelink. The identifier information of the sidelink may include, for example, an index of the sidelink, which may be used to point to one sidelink identifier in the destination address of the sidelink reported by the second UE. When the second UE sends the recommended DRX parameters, it may also send the index, and the base station may determine the sidelink between the first UE and the second UE according to the index and configure the DRX parameters of the sidelink.

In one embodiment, the data communication method may further include:

sending the DRX parameters of the sidelink to the second UE.

The base station may send the determined DRX parameters of the sidelink to the second UE. The second UE may send the received DRX parameters of the sidelink to the first UE. The first UE switches between a sleep state and an on duration state during the DRX cycle based on the DRX parameters of the sidelink. In the on duration state, data communication is performed with the second UE via the sidelink.

The second UE may determine the on duration period of the first UE according to the target DRX parameter and perform data communication with the first UE during the active and on duration periods of the first UE.

A specific example is provided below in conjunction with any of the above embodiments.

1. After receiving the DRX parameters for Uu reception configured by the base station when UE1 is in the connected state, the DRX parameters for the Uu port configured by the base station may be sent to an opposite end UE2 via a sidelink RRC message.
   i. The parameters of DRX for Uu reception include a DRX cycle, a start offset, an on duration timer, an inactivity timer, an inactivity timer, etc.
2. When UE1 is in the idle or inactive state, the DRX parameter for paging is sent to the opposite end UE2 via the sidelink RRC message.
   i. The DRX parameters for paging reception includes: a DRX cycle, a paging frame offset, a frame identifier, and a subframe identifier. The frame identifier is defined as the integer quotient obtained by dividing the DRX cycle by the number of paging frames in the cycle, multiplied by the remainder obtained by dividing the UE identifier by the number of paging frames in the cycle. The subframe identifier is one or more subframe numbers and is the number of the subframe at the paging occasion.
   ii. the DRX parameters for paging reception include: a DRX cycle, the number of paging frames in a DRX cycle, the number of paging occasions contained in each paging frame, a paging frame offset, and a UE identifier UE_ID.
3. UE1 sends the DRX parameters it expects to be used for sidelink to the opposite end UE2 via the sidelink RRC, including an inactivity timer, an on duration timer, a DRX cycle and a start offset, an uplink HARQ RTT timer, a downlink HARQ RTT timer, an uplink retransmission timer, a downlink retransmission timer, etc.
4. After UE2 receives the DRX parameters for Uu or paging reception at the opposite end UE1 through the sidelink RRC message, if UE2 is in the connected state, these parameters are reported to the base station, while carrying the sidelink identifier of the opposite end UE. The base station reasonably configures the DRX parameters of the sidelink according to these parameters. If UE2 is in the idle or inactive state, UE2 reasonably configures the DRX parameters of the sidelink according to these parameters.

Figure 7:
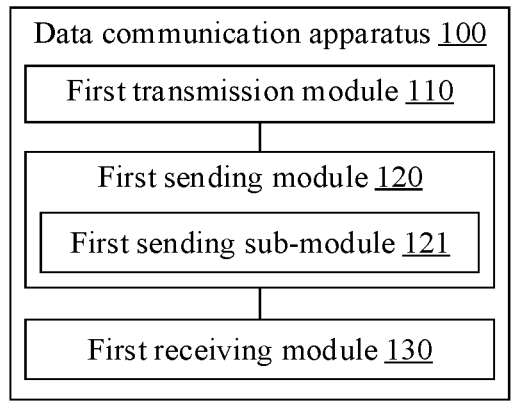
FIG. 7 is a block diagram of a data communication apparatus illustrated according to an exemplary embodiment.

The embodiment of the present disclosure also provides a data communication apparatus, which is applied to a first UE. FIG. 7 shows a schematic diagram of a composition structure of a data communication apparatus 100 provided by the embodiment of the present disclosure. As shown in FIG. 7, the apparatus 100 includes: a first transmission module 110.

The first transmission module 110 is configured to, according to DRX parameters of a sidelink determined by DRX parameters of a Uu port of the first UE, perform data communication with the second UE via the sidelink during an on duration period of the first UE.

In one embodiment, the apparatus 100 further includes:
a first sending module 120, configured to send at least one set of DRX parameters of the Uu port of the first UE to the second UE via the sidelink;
a first receiving module 130, configured to receive the DRX parameters of the sidelink returned by the second UE based on the at least one set of DRX parameters of the Uu port of the first UE.

In one embodiment, the first sending module 120 includes:
a first sending sub-module 121, configured to, in response to the first UE being in an idle or inactive state, send to the second UE the DRX parameters of the Uu port used by the first UE to receive a paging message via the sidelink.

in one embodiment, the DRX parameters of the Uu port used by the first UE to receive the paging message, includes: a DRX cycle, a paging frame offset, a number of paging frames in a DRX cycle, a number of paging occasions contained in each paging frame, an identifier of the first UE, a frame identifier of a paging frame and/or a subframe identifier of a paging frame;
where the frame identifier of the paging frame and/or the subframe identifier of the paging frame is used to determine the on duration period of the first UE.

In one embodiment, in response to the first UE being in a connected state, the DRX parameters of Uu port of the first UE include:
a DRX cycle, a DRX cycle start offset, an on duration timer, an inactivity timer, n inactivity timer, an uplink hybrid automatic retransmission request round trip time (HARQ RTT) timer, a downlink HARQ RTT timer, an uplink retransmission timer and/or a downlink retransmission timer.

Figure 8:
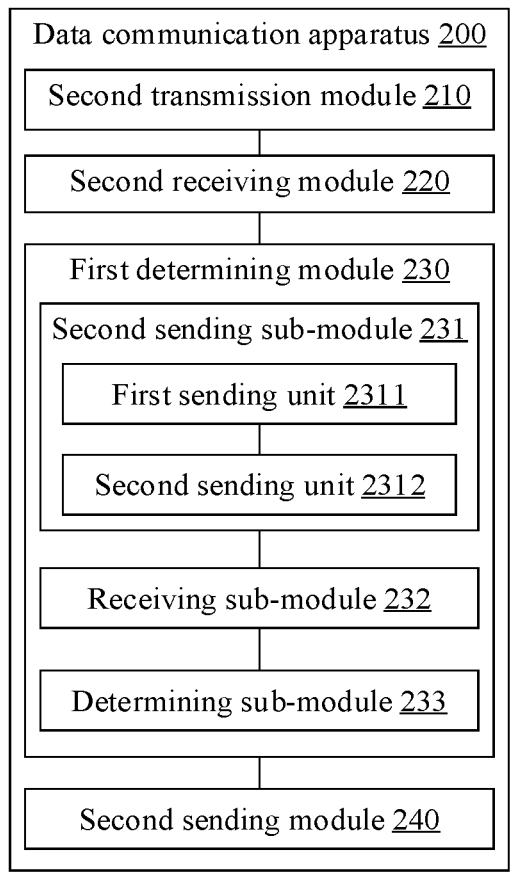
FIG. 8 is a block diagram of another data communication apparatus illustrated according to an exemplary embodiment.

Embodiments of the present disclosure also provide a data communication apparatus, which is applied to a second UE. FIG. 8 shows a schematic diagram of a composition structure of a data communication apparatus 200 provided by the embodiments of the present disclosure. As shown in FIG. 8, the apparatus 200 includes: a second transmission module 210.

The second transmission module 210 is configured to perform data communication with a first UE via a sidelink during an on duration period of the first UE, according to DRX parameters of the sidelink determined by DRX parameters of a Uu port of the first UE.

In one embodiment, the apparatus 200 further includes:
a second receiving module 220, configured to receive at least one set of the DRX parameters of Uu port of the first UE sent by the first UE;
a first determining module 230, configured to determine the DRX parameters of the sidelink according to the at least one set of DRX parameters of the Uu port of the first UE.

In one embodiment, the first determining module 230 includes:
a second sending sub-module 231, configured to send at least one set of DRX parameters of the Uu port of the first UE to a base station where the second UE resides;
a receiving sub-module 232, configured to receive the DRX parameters of the sidelink returned by the base station based on at least one set of the DRX parameters of the Uu port of the first UE.

In one embodiment, the second sending sub-module 231 includes:

a first sending unit 2311, configured to send the at least one set of DRX parameters of the Uu port of the first UE to the base station in response to the second UE being in a connected state.

In one embodiment, the second sending sub-module 231 includes:
a second sending unit 2312, configured to send to the base station at least one set of DRX parameters of the Uu port of the first UE, and a sidelink identifier and/or identifier information for the sidelink of the first UE; where the sidelink identifier and/or identifier information of the sidelink of the first UE is used for the base station to determine the sidelink.

In one embodiment, the first determining module 230 includes:
a determining sub-module 233, configured to determine, by the second UE, the DRX parameter of the sidelink according to the at least one set of DRX parameters of the Uu port of the first UE, in response to the second UE being in an idle or inactive state.

In one embodiment, in response to the first UE being in an idle or inactive state, the DRX parameters of the Uu port of the first UE include: a DRX cycle, a paging frame offset, a number of paging frames in a DRX cycle, a number of paging occasions contained in each paging frame, an identifier of the first UE, a frame identifier of a paging frame and/or a subframe identifier of a paging frame; where the frame identifier of the paging frame and/or the subframe identifier of the paging frame is used for determining the on duration period of the first UE.

In one embodiment, in response to the first UE being in a connected state, the DRX parameters of the Uu port of the first UE include:
a DRX cycle, a DRX cycle start offset, an on duration timer, an inactivity timer, an inactivity timer, an uplink hybrid automatic retransmission request round trip time (HARQ RTT) timer, a downlink HARQ RTT timer, an uplink retransmission timer and/or a downlink retransmission timer.

In one embodiment, the apparatus 200 further includes:
a second sending module 240, configured to send the DRX parameters of the sidelink to the first UE.

Figure 9:
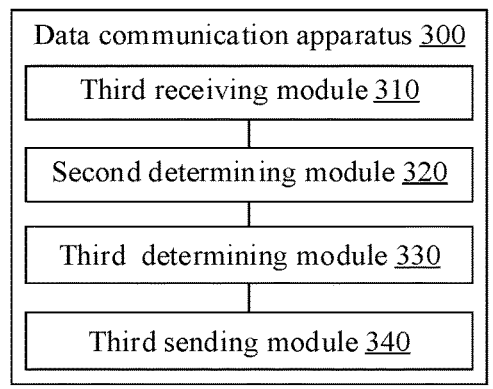
FIG. 9 is a block diagram of yet another data communication apparatus illustrated according to an exemplary embodiment.

Embodiments of the present disclosure also provide a data communication apparatus, which is applied in a base station. FIG. 9 shows a schematic diagram of a composition structure of a data communication apparatus 300 provided by the embodiments of the present disclosure. As shown in FIG. 9, the apparatus 300 includes: a third receiving module 310 and a second determining module 220, where
the third receiving module 310 is configured to receive at least one set of DRX parameters of Uu port of the first UE sent by the second UE;
the second determining module 320 is configured to determine DRX parameters of a sidelink between the first UE and the second UE according to the at least one set of DRX parameters of the Uu port of the first UE.

In one embodiment, in response to the first UE being in an idle or inactive state, the DRX parameters of the Uu port of the first UE includes: a DRX cycle, a paging frame offset, a number of paging frames in a DRX cycle, a number of paging occasions contained in each paging frame, an identifier of the first UE, a frame identifier of a paging frame and/or a subframe identifier of a paging frame; where the frame identifier of the paging frame and/or the subframe identifier of the paging frame is used for determining the on duration period of the first UE.

In one embodiment, in response to the first UE being in a connected state, the DRX parameters of the Uu port of the first UE include:
a DRX cycle, a DRX cycle start offset, an on duration timer, an inactivity timer, an inactivity timer, an uplink hybrid automatic retransmission request round trip time (HARQ RTT) timer, a downlink HARQ RTT timer, uplink retransmission timer and/or a downlink retransmission timer.

In one embodiment, the apparatus 300 further includes:
a third determining module 330, configured to determine the sidelink according to a sidelink identifier and/or identifier information of the sidelink of the first UE sent by the second UE.

In one embodiment, the apparatus 300 further includes:
a third sending module 340, configured to send the DRX parameters of the sidelink to the second UE.

In an exemplary embodiment, the first transmission module 110, the first sending module 120, the first receiving module 130, the second transmission module 210, the second receiving module 220, the first determining module 230, the second sending module 240, the third receiving module 310, the second determining module 320, the third determining module 330, and the third sending module 340 and the like may be implemented by one or more Central Processing Unit (CPU), Graphics Processing Unit (GPU), baseband processor (BP), Application Specific Integrated Circuit (ASIC), DSP, Programmable Logic Device (PLD), Complex Programmable Logic Device (CPLD), Field-Programmable Gate Array (FPGA), general purpose processor, controller, Micro Controller Unit (MCU), microprocessor, or other electronic component, or in combination with one or more radio frequency (RF) antennas, to perform the aforementioned methods.

Figure 10:
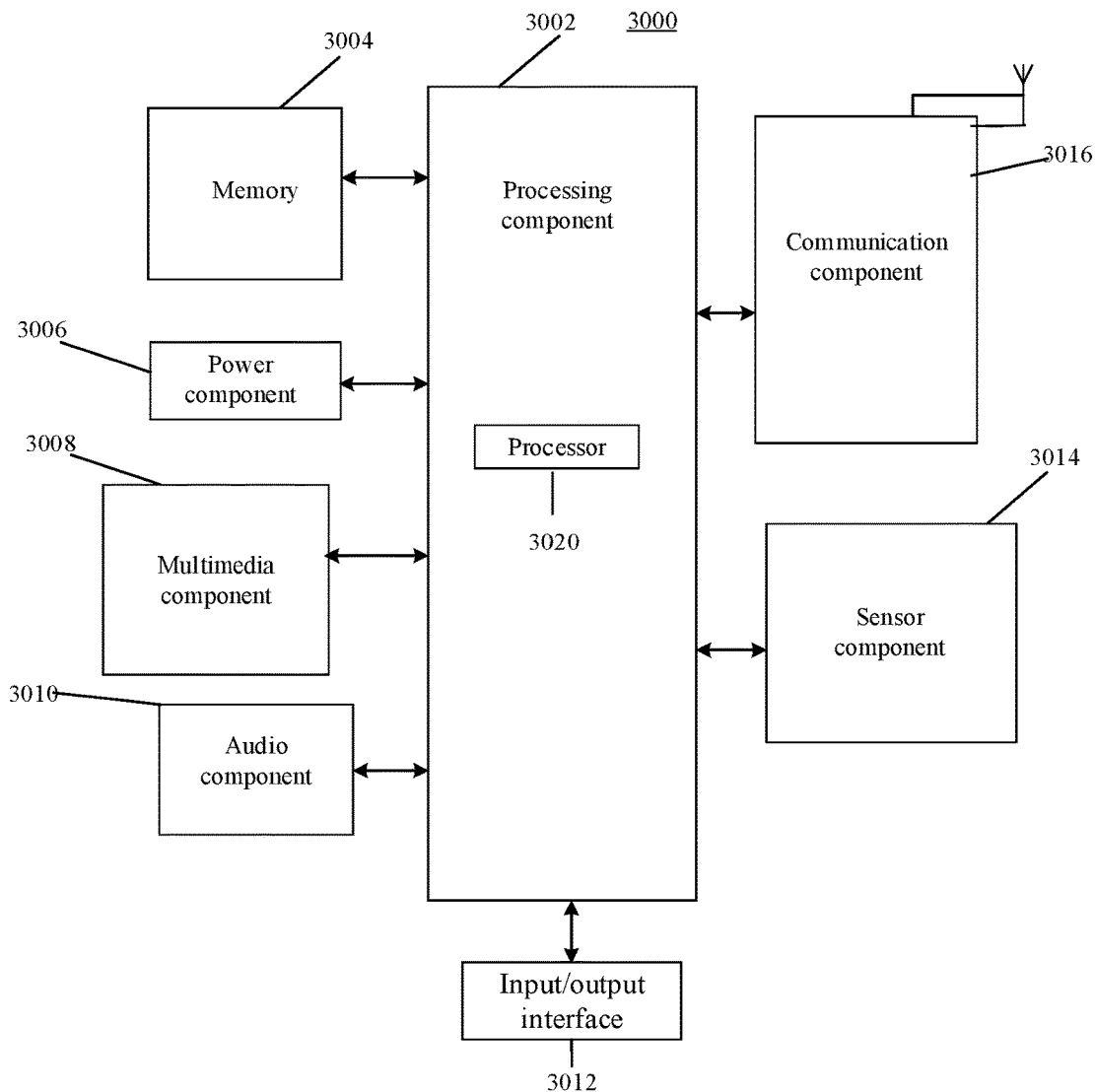
FIG. 10 is a block diagram of an apparatus for data communication according to an exemplary embodiment.

FIG. 10 is a block diagram of an apparatus 3000 for data communication according to an exemplary embodiment. For example, the apparatus 3000 may be a mobile phone, a computer, a digital broadcast terminal, a messaging apparatus, a gaming console, a tablet, a medical apparatus, exercise equipment, a personal digital assistant, etc.

Referring to FIG. 10, the apparatus 3000 may include one or more of the following components: a processing component 3002, a memory 3004, a power component 3006, a multimedia component 3008, an audio component 3010, an input/output (I/O) interface 3012, a sensor component 3014, and a communication component 3016.

The processing component 3002 typically controls overall operations of the apparatus 3000, such as the operations associated with display, telephone calls, data communications, camera operations, and recording operations. The processing component 3002 may include one or more processors 3020 to execute instructions to perform all or part of the steps in the above described methods. Moreover, the processing component 3002 may include one or more modules which facilitate the interaction between the processing component 3002 and other components. For instance, the processing component 3002 may include a multimedia module to facilitate the interaction between the multimedia component 3008 and the processing component 3002.

The memory 3004 is configured to store various types of data to support the operation of the apparatus 3000. Examples of such data include instructions for any applications or methods operated on the apparatus 3000, contact data, phonebook data, messages, pictures, video, etc. The memory 3004 may be implemented using any type of volatile or non-volatile memory apparatuses, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or an optical disk.

The power component 3006 provides power to various components of the apparatus 3000. The power component 3006 may include a power management system, one or more power sources, and any other components associated with the generation, management, and distribution of power in the apparatus 3000.

The multimedia component 3008 includes a screen providing an output interface between the apparatus 3000 and the user. In some embodiments, the screen may include a liquid crystal display (LCD) and a touch panel (TP). If the screen includes the touch panel, the screen may be implemented as a touch screen to receive input signals from the user. The touch panel includes one or more touch sensors to sense touches, swipes, and gestures on the touch panel. The touch sensors may not only sense a boundary of a touch or swipe action, but also sense a period of time and a pressure associated with the touch or swipe action. In some embodiments, the multimedia component 3008 includes a front camera and/or a rear camera. The front camera and the rear camera may receive an external multimedia datum while the apparatus 3000 is in an operation mode, such as a photographing mode or a video mode. Each of the front camera and the rear camera may be a fixed optical lens system or have focus and optical zoom capability.

The audio component 3010 is configured to output and/or input audio signals. For example, the audio component 3010 includes a microphone (MIC) configured to receive an external audio signal when the apparatus 3000 is in an operation mode, such as a call mode, a recording mode, and a voice recognition mode. The received audio signal may be further stored in the memory 3004 or transmitted via the communication component 3016. In some embodiments, the audio component 3010 further includes a speaker to output audio signals.

The I/O interface 3012 provides an interface between the processing component 3002 and peripheral interface modules, such as a keyboard, a click wheel, buttons, and the like. The buttons may include, but are not limited to, a home button, a volume button, a starting button, and a locking button.

The sensor component 3014 includes one or more sensors to provide status assessments of various aspects of the apparatus 3000. For instance, the sensor component 3014 may detect an open/closed status of the apparatus 3000, relative positioning of components, e.g., the display and the keypad, of the apparatus 3000, a change in position of the apparatus 3000 or a component of the apparatus 3000, a presence or absence of user contact with the apparatus 3000, an orientation or an acceleration/deceleration of the apparatus 3000, and a change in temperature of the apparatus 3000. The sensor component 3014 may include a proximity sensor configured to detect the presence of nearby objects without any physical contact. The sensor component 3014 may also include a light sensor, such as a CMOS or CCD image sensor, for use in imaging applications. In some embodiments, the sensor component 3014 may also include an accelerometer sensor, a gyroscope sensor, a magnetic sensor, a pressure sensor, or a temperature sensor.

The communication component 3016 is configured to facilitate communication, wired or wirelessly, between the apparatus 3000 and other apparatus. The apparatus 3000 may access a wireless network based on a communication standard, such as WiFi, 2G, or 3G, or a combination thereof. In one exemplary embodiment, the communication component 3016 receives a broadcast signal or broadcast associated information from an external broadcast management system via a broadcast channel. In one exemplary embodiment, the communication component 3016 further includes a near field communication (NFC) module to facilitate short-range communications. For example, the NFC module may be implemented based on a radio frequency identification (RFID) technology, an infrared data association (IrDA) technology, an ultra-wideband (UWB) technology, a Bluetooth (BT) technology, and other technologies.

In exemplary embodiments, the apparatus 3000 may be implemented with one or more application specific integrated circuits (ASICs), digital signal processors (DSPs), digital signal processing apparatuses (DSPDs), programmable logic apparatuses (PLDs), field programmable gate arrays (FPGAs), controllers, micro-controllers, microprocessors, or other electronic components, for performing the above described methods.

The present disclosure may include dedicated hardware implementations such as application specific integrated circuits, programmable logic arrays and other hardware devices. The hardware implementations can be constructed to implement one or more of the methods described herein. Examples that may include the apparatus and systems of various implementations can broadly include a variety of electronic and computing systems. One or more examples described herein may implement functions using two or more specific interconnected hardware modules or devices with related control and data signals that can be communicated between and through the modules, or as portions of an application-specific integrated circuit. Accordingly, the system disclosed may encompass software, firmware, and hardware implementations. The terms "module," "sub-module," "circuit," "sub-circuit," "circuitry," "sub-circuitry," "unit," or "sub-unit" may include memory (shared, dedicated, or group) that stores code or instructions that can be executed by one or more processors. The module refers herein may include one or more circuit with or without stored code or instructions. The module or circuit may include one or more components that are connected.

In exemplary embodiments, there is also provided a non-transitory computer-readable storage medium including instructions, such as the memory 3004 including instructions, the above instructions may be executed by the processor 3020 in the apparatus 3000 for performing the above-described methods. For example, the non-transitory computer-readable storage medium may be a ROM, a Random Access Memory (RAM), a CD-ROM, a magnetic tape, a floppy disc, an optical data storage device, and the like.

Other embodiments of the present disclosure will be apparent to those skilled in the art from consideration of the specification and practice of the present disclosure disclosed here. The present disclosure is intended to cover any variations, uses, or adaptations of the present disclosure following the general principles thereof and including the common general knowledge or habitual technical means in the technical field not disclosed in the present disclosure. The specification and embodiments are considered as exemplary only, and a true scope and spirit of the present disclosure is indicated by the appending claims.

It will be appreciated that the present disclosure is not limited to the exact construction that has been described above and illustrated in the accompanying drawings, and that various modifications and changes may be made without departing from the scope thereof.

What is claimed is:

1. A data communication method, applied to a first user equipment (UE), comprising:
    sending a discontinuous reception (DRX) parameter of a Uu port of the first UE to a second UE via a sidelink, wherein the DRX parameter of the Uu port of the first UE is used to determine a DRX parameter of a sidelink between the first UE and the second UE, and the DRX parameter of the sidelink is determined by the second UE or by a base station after receiving the DRX parameter of the Uu port of the first UE forwarded by the second UE; wherein the DRX parameter of the sidelink is the same as the DRX parameter of the Uu port of the first UE,
    receiving the DRX parameter of the sidelink sent or forwarded by the second UE, and
    performing data communication with the second UE via the sidelink during an on duration period indicated by the DRX parameter of the sidelink;
    wherein sending the DRX parameter of the Uu port of the first UE to the second UE via the sidelink comprises:
    sending at least one set of DRX parameters of the Uu port of the first UE to the second UE via the sidelink;
        wherein sending the at least one set of DRX parameters of the Uu port of the first UE to the second UE via the sidelink, comprises:
            in response to the first UE being in an idle state or an inactive state, sending to the second UE a DRX parameter of the Uu port used by the first UE to receive a paging message via the sidelink.

2. The method according to claim 1, further comprising:
    receiving the DRX parameter of the sidelink returned by the second UE based on the at least one set of DRX parameters of the Uu port of the first UE.

3. The method according to claim 1, wherein the DRX parameter of the Uu port used by the first UE to receive the paging message comprises:
    a DRX cycle, a paging frame offset, a number of paging frames in a DRX cycle, a number of paging occasions contained in each paging frame, an identifier of the first UE, a frame identifier of a paging frame and/or a subframe identifier of a paging frame; and
    wherein the frame identifier of the paging frame and/or the subframe identifier of the paging frame is used for determining the on duration period.

4. The method according to claim 1, wherein, in response to the first UE being in a connected state, the DRX parameter of the Uu port of the first UE comprises:
    a DRX cycle, a DRX cycle start offset, an on duration timer, an inactivity timer, an inactivity timer, an uplink hybrid automatic retransmission request round trip time (HARQ RTT) timer, a downlink HARQ RTT timer, an uplink retransmission timer and/or a downlink retransmission timer.

5. A data communication method, applied to a second user equipment (UE), comprising:
    receiving a discontinuous reception (DRX) parameter of a Uu port of a first UE sent by the first UE,
    determining a DRX parameter of a sidelink between the first UE and the second UE, wherein the DRX parameter of the sidelink is determined by the second UE according to the DRX parameter of the Uu port of the first UE or by a base station according to the DRX parameter of the Uu port of the first UE forwarded by the second UE; wherein the DRX parameter of the sidelink is the same as the DRX parameter of the Uu port of the first UE, sending to the first UE the DRX parameter of the sidelink, and performing data communication with the first UE via the sidelink during an on duration period indicated by the DRX parameter of the sidelink;

wherein receiving the DRX parameter of the Uu port of the first UE sent by the first UE comprises:

receiving at least one set of DRX parameters of the Uu port of the first UE sent by the first UE;

wherein receiving the at least one set of DRX parameters of the Uu port of the first UE sent by the first UE, comprises:

receiving, via the sidelink, a DRX parameter of the Uu port used by the first UE to receive a paging message sent by the first UE in response to the first UE being in an idle state or an inactive state.

6. The method according to claim 5, wherein determining the DRX parameter of the sidelink according to the DRX parameter of the Uu port of the first UE, comprises:

determining the DRX parameter of the sidelink according to the least one set of DRX parameters of the Uu port of the first UE.

7. The method according to claim 6, wherein determining the DRX parameter of the sidelink according to the at least one set of DRX parameters of the Uu port of the first UE, comprises:

in response to the second UE being in an idle state or an inactive state, determining, by the second UE, the DRX parameter of the sidelink according to the at least one set of DRX parameters of the Uu port of the first UE.

8. The method according to claim 6, wherein determining the DRX parameter of the sidelink according to the at least one set of DRX parameters of the Uu port of the first UE, comprises:

sending to the base station where the second UE resides the at least one set of DRX parameters of the Uu port of the first UE; and receiving the DRX parameter of the sidelink returned by the base station based on the at least one set of DRX parameters of the Uu port of the first UE.

9. The method according to claim 8, wherein sending to the base station where the second UE resides the at least one set of DRX parameters of the Uu port of the first UE, comprises:

in response to the second UE being in a connected state, sending at least one set of DRX parameters of the Uu port of the first UE to the base station.

10. The method according to claim 8, wherein sending to the base station where the second UE resides the at least one set of DRX parameters of the Uu port of the first UE, comprises:

sending to the base station at least one set of DRX parameters of the Uu port of the first UE, and a sidelink identifier of the first UE and/or identifier information of the sidelink; wherein the sidelink identifier of the first UE and/or the identifier information of the sidelink is used for the base station to determine the sidelink.

11. The method according to claim 5, wherein, in response to the first UE being in the idle state or the inactive state, the DRX parameter of the Uu port of the first UE comprises: a DRX cycle, a paging frame offset, a number of paging frames in a DRX cycle, a number of paging occasions contained in each paging frame, an identifier of the first UE, a frame identifier of a paging frame and/or a subframe identifier of a paging frame; wherein the frame identifier of the paging frame and/or the subframe identifier of the paging frame is used for determining the on duration period.

12. The method according to claim 5, wherein, in response to the first UE being in a connected state, the DRX parameter of the Uu port of the first UE comprises:

a DRX cycle, a DRX cycle start offset, an on duration timer, an inactivity timer, an inactivity timer, an uplink hybrid automatic retransmission request round trip time (HARQ RTT) timer, a downlink HARQ RTT timer, an uplink retransmission timer and/or a downlink retransmission timer.

13. A data communication method, applied to a base station, comprising:

receiving a discontinuous reception (DRX) parameter of a Uu interface of a first user equipment (UE) forwarded by a second UE, determining a DRX parameter of a sidelink between the first UE and the second UE according to the DRX parameter of the Uu port of the first UE, wherein the DRX parameter of the sidelink is used for data communication between the first UE and the second UE via the sidelink, and the DRX parameter of the sidelink is the same as the DRX parameter of the Uu port of the first UE, and sending the DRX parameter of the sidelink to the first UE via forwarding by the second UE;

wherein determining the DRX parameter of the sidelink between the first UE and the second UE according to the DRX parameter of the Uu port of the first UE, comprises:

receiving at least one set of DRX parameters of the Uu port of the first UE sent by the second UE; and determining the DRX parameter of the sidelink between the first UE and the second UE according to the at least one set of DRX parameters of the Uu port of the first UE;

wherein receiving the at least one set of DRX parameters of the Uu port of the first UE sent by the second UE, comprises:

receiving a DRX parameter of the Uu port used by the first UE to receive a paging message, sent by the first UE and forwarded by the second UE, in response to the first UE being in an idle state or an inactive state.

14. The method according to claim 13, further comprising:

determining the sidelink according to a sidelink identifier of the first UE and/or identifier information of the sidelink sent by the second UE.

15. The method according to claim 13, further comprising:

sending to the second UE the DRX parameter of the sidelink.

16. A data communication apparatus, applied to a first user equipment (UE), comprising: a processor, a transceiver, a memory and an executable program stored on the memory and capable of being run by the processor, wherein, when the processor runs the executable program, the processor is configured to:

send a discontinuous reception (DRX) parameter of a Uu port of the first UE to a second UE via a sidelink, wherein the DRX parameter of the Uu port of the first UE is used to determine a DRX parameter of a sidelink between the first UE and the second UE determined by a DRX parameter of a Uu port of the first UE, and the DRX parameter of the sidelink is determined by the second UE or by a base station after receiving the DRX parameter of the Uu port of the first UE forwarded by the second UE; wherein the DRX parameter of the sidelink is the same as the DRX parameter of the Uu port of the first UE, receive the DRX parameter of the sidelink sent or forwarded by the second UE, and perform data communication with the second UE via the sidelink during an on duration period indicated by the DRX parameter of the sidelink;

wherein the processor is further configured to:
send at least one set of DRX parameters of the Uu port of the first UE to the second UE via the sidelink;
wherein the processor is further configured to:
in response to the first UE being in an idle state or an inactive state, send to the second UE a DRX parameter of the Uu port used by the first UE to receive a paging message via the sidelink.

17. A data communication apparatus, applied to a second user equipment (UE), comprising: a processor, a transceiver, a memory and an executable program stored on the memory and capable of being run by the processor, wherein, when the processor runs the executable program, the processor is configured to:

receive a discontinuous reception (DRX) parameter of a Uu port of a first UE sent by the first UE, determine a DRX parameter of a sidelink between the first UE and the second UE, wherein the DRX parameter of the sidelink is determined by the second UE according to the DRX parameter of the Uu port of the first UE or by a base station according to the DRX parameter of the Uu port of the first UE forwarded by the second UE; wherein the DRX parameter of the sidelink is the same as the DRX parameter of the Uu port of the first UE, send to the first UE the DRX parameter of the sidelink, and perform data communication with the first UE via the sidelink during an on duration period indicated by the DRX parameter of the sidelink;

wherein the processor is further configured to:
receive at least one set of DRX parameters of the Uu port of the first UE sent by the first UE;
wherein the processor is further configured to:
receive, via the sidelink, a DRX parameter of the Uu port used by the first UE to receive a paging message sent by the first UE in response to the first UE being in an idle state or an inactive state.

18. A data communication apparatus, applied to a base station, comprising: a processor, a transceiver, a memory and an executable program stored on the memory and capable of being run by the processor, wherein, when the processor runs the executable program, the processor is configured to:

receive a discontinuous reception (DRX) parameter of a Uu interface of a first user equipment (UE) forwarded by a second UE, determine a DRX parameter of a sidelink between the first UE and the second UE according to the DRX parameter of the Uu port of the first UE, wherein the DRX parameter of the sidelink is used for data communication between the first UE and the second UE via the sidelink, and the DRX parameter of the sidelink is the same as the DRX parameter of the Uu port of the first UE, and send the DRX parameter of the sidelink to the first UE via forwarding by the second UE;

wherein the processor is further configured to:
receive at least one set of DRX parameters of the Uu port of the first UE sent by the second UE;
determine the DRX parameter of the sidelink between the first UE and the second UE according to the at least one set of DRX parameters of the Uu port of the first UE;
wherein the processor is further configured to:
receive a DRX parameter of the Uu port used by the first UE to receive a paging message, sent by the first UE and forwarded by the second UE, in response to the first UE being in an idle state or an inactive state.

* * * * *